United States Patent [19]

Sofy

[11] 4,198,845

[45] Apr. 22, 1980

[54] TRANSFER DEVICE

[76] Inventor: Hugh M. Sofy, 1230 E. Big Beaver, Troy, Mich. 48084

[21] Appl. No.: 957,934

[22] Filed: Nov. 6, 1978

[51] Int. Cl.[2] ............................................. B21D 43/05
[52] U.S. Cl. ..................................... 72/421; 198/621; 198/740
[58] Field of Search ......................... 72/421, 405, 404; 198/621, 740, 741; 214/750, 751

[56] References Cited

U.S. PATENT DOCUMENTS

| | | | |
|---|---|---|---|
| 3,155,241 | 11/1964 | Suofy | 198/621 |
| 3,421,637 | 1/1969 | Sofy | 198/621 |
| 3,422,657 | 1/1969 | Grombka | 72/421 |
| 3,655,070 | 4/1972 | Haydu | 198/621 |
| 3,757,961 | 9/1973 | Jacobs | 414/750 |

FOREIGN PATENT DOCUMENTS

| | | | |
|---|---|---|---|
| 1232097 | 6/1961 | Fed. Rep. of Germany | 72/405 |
| 2435395 | 2/1975 | Fed. Rep. of Germany | 72/405 |

*Primary Examiner*—Francis S. Husar
*Assistant Examiner*—Gene P. Crosby
*Attorney, Agent, or Firm*—Harness, Dickey & Pierce

[57] ABSTRACT

A transfer device for transferring workpieces progressively from station to station in a press by means of mechanical linkages actuated by the press ram. The linkages have a brake mechanism strategically located and uniquely operative to prevent destructive vibrations that otherwise occur particularly during high speed operation of the press. The device has the further optional capability of lifting and carrying all or selected workpieces during the transfer operation.

8 Claims, 8 Drawing Figures

TRANSFER DEVICE

BACKGROUND OF THE INVENTION

The invention relates generally to transfer devices for moving workpieces progressively through a series of work stations in a machine, and more particularly, it is an improved form of the transfer device of the type shown in the Suofy U.S. Pat. Nos. 3,155,241 issued Nov. 3, 1964 and the Sofy U.S. Pat. 3,421,637 issued Jan. 14, 1967. As in the case of the earlier devices, the transfer device of this invention is primarily adapted and preeminently suited for use with presses and the like. It operates basically in the same manner as the predecessor transfer devices but incorporates significant changes and modifications that permit it to operate at significantly higher speeds without excessive destructive vibrations in use and it further incorporates as an optional feature the capability of lifting and carrying the workpieces from one station to the next. The lift and carry feature is uniquely designed so that it can be incorporated in all of the work stations, or it can be utilized in selected work stations only in combination with other transfer means that simply slide or index the workpieces from one station to another in a straight transverse motion.

SUMMARY OF THE INVENTION

The transfer device of this invention moves a pair of elongate, opposed, work holding jaw blades back and forth in a horizontal plane by a first actuator means. The jaw blades are disposed on opposite sides of and parallel to a series of work stations and in use they are moved initially horizontally inwardly toward the work stations and into engagement with workpieces in the stations. Thereafter, the jaw blades are indexed horizontally along the line of the stations by a second actuator means to advance the workpieces simultaneously one station in the series. After all of the workpieces have been advanced one station, the jaw blades are moved apart by the first actuator means to disengage the workpieces and then retracted to their starting positions by the second actuator means. Both actuator means are in the form of mechanical linkages that are suitably interconnected so that they are operated by the ram which is a conventional structural part of the press to move the work holding jaw blades in the sequence of motions hereinabove described. Each of the transfer linkages includes a rock shaft that oscillates back and forth during operation of the actuator means, and oscillatory motion of the rock shafts is transmitted to the work holding jaw blades through cam and cam follower means.

Because of the clearances necessarily present in the actuator linkages, the latter have a tendency to vibrate in use. These operational vibrations are not a problem if the press is operated at slow speeds in the order of 7 or 8 cycles per minute; however, if the press is operated substantially faster, the vibrations become significant and at times even destructive. A significant part of the concept of this invention resides in the discovery that these objectionable and destructive vibrations are obviated by a brake mechanism attached to and cooperative with the rock shaft of one or both of the actuator linkages. When the brake mechanism or mechanisms are installed in this particular location in the transfer device, the press can be operated satisfactorily at speeds up to several times the speed at which it can be operated without the brake mechanism. As a consequence, the improved transfer device of this invention greatly increases and improves the production capacity of the press.

As suggested, the transfer device of this invention in its basic concept operates in a single horizontal plane. The jaws first move inwardly to clamp the workpieces, then move laterally to slide the workpieces simultaneously into adjacent stations, then separate to disengage the workpieces, and finally retract to the initial or starting position. However, it sometimes happens that, because of the shape of the workpiece or because of the nature of the forming operations performed thereon, in some or all of the stations, it is not convenient or even possible simply to slide the workpieces along from one station to the next. Rather, it is necessary to lift the workpieces out of the forming dies in one or several or perhaps all of the stations in order to transfer them to the adjacent stations and then after arriving at the adjacent stations, to drop them onto the dies in these stations. It is a special feature of the invention that the work clamping jaws can be modified as required to incorporate a lift and carry feature in all or selected stations. Thus, the workpieces can be simply slid from one station to the next by a straight traverse motion of the jaws or they can be lifted out of the stations and dropped into the adjacent stations as required by the shape of the workpiece and the particular forming operation. In other words, the lift and carry form of transfer can be incorporated in all of the stations or it can be used in combination with the straight-through traverse form of transfer.

BRIEF DESCRIPTION OF THE DRAWINGS

FIG. 3 is an enlarged, fragmentary, perspective view showing a portion of the linkage mechanism that advances the workpieces in the press and particularly illustrating the brake mechanism that obviates destructive vibrations that otherwise occur in the linkage of the transfer actuator when the press is operated at relatively high speeds;

DESCRIPTION OF THE PREFERRED EMBODIMENT

Figures 2, 2A:
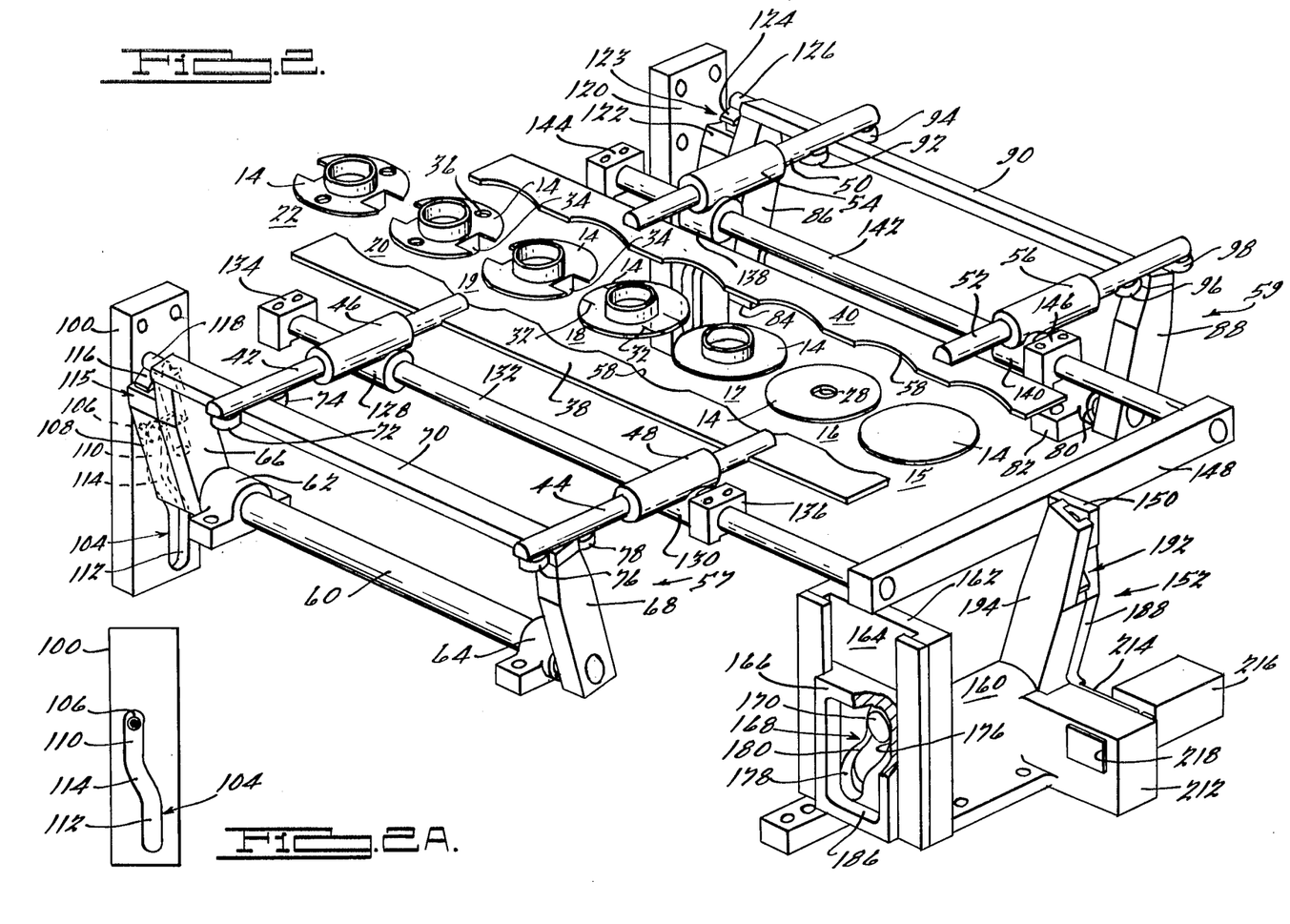
FIG. 2 is an enlarged perspective view of the transfer device, per se.
FIG. 2A is an elevational view showing one of the cam bars and its associated cam follower roller that actuate part of the transfer mechanism to clamp and unclamp the work.

In the drawing wherein for the purpose of illustration is shown a preferred embodiment of the invention, the numeral 10 designates a standard punch press having a die shoe 12 which supports a plurality of lower die members 13 in a series of stations represented by the numerals 15, 16, 17, 18, 19, 20 and 22 (FIG. 2). Workpieces 14 are formed by the die members 13 in conjunction with upper die members (not shown) carried by a punch shoe 24 driven in the conventional manner by a power ram, a fragmentary portion of which is shown at 26. The punch shoe 24 is moved downwardly under power by the ram 26 to form the workpieces 14 in a plurality of equispaced stations 15–22, and after the forming operation is completed the punch shoe is retracted by the ram 26.

In the particular press 10 and workpiece here shown by way of illustration, a flat disk shaped workpiece 14 is placed in the loading station 15 manually or by suitable automatic means and a hole 28 is formed centrally therein in the first work station 16. A centrally disposed upstanding collar 30 is formed in the second work station 17. Spaced parallel slots 32 are formed at opposite sides of the workpiece 14 in the third work station 18, and in the fourth work station 19 the portions of the workpiece between the slots 32 are bent downwardly to form depending tabs 34. In the fifth work station 20, openings 36 are punched in the workpiece 14 on opposite sides thereof intermediate the tabs 34. The unfinished workpiece 14 is removed from the unloading station 22 either manually or by suitable automatic means.

The transfer device of this invention is mounted on the die shoe 12 at opposite sides and at one end of the series of work stations 15–22 and it is operatively connected to the ram 26 to advance all of the workpieces 14 simultaneously one station in the press 10 each time it cycles. More particularly, in operation the transfer device moves elongate jaw blades 38 and 40 disposed at opposite sides of the work stations 15–22 first into clamping engagement with the workpieces 14, then advances the workpieces one station in the press as the ram 26 is raised or retracted; and, as the ram is moved downwardly to bring the dies together in the forming operation, the transfer device separates the jaws 38 and 40 to release the workpieces and then retracts the jaws to the initial or starting position.

For a more detailed description of the transfer mechanism, attention is first directed to FIG. 2 which shows that the jaw blade 38 is carried by a pair of spaced parallel rods 42 and 44 that extend laterally away from the stations 15–22 and are mounted for reciprocation in elongate bearings 46 and 48, respectively. The jaw blade 40 is similarly carried by a pair of rods 50 and 52 that slidably operate in elongate bearings 54 and 56. The two jaw blades 38 and 40 extend substantially the full length of the work stations 15–22 and the inner edges of the blades are scalloped as at 58. The scallops 58 are spaced to receive and are shaped to conform to the peripheral edges of the workpieces 14 in the stations. It will be observed that the jaw blades 38 and 40 are disposed on opposite sides of the series of staions 15–22 and that the scallops 58 are spaced the same distance apart as the stations so that each scallop fits and clampingly engages an edge portion of the workpiece in the station with which it is associated when the jaw-carrying rods 42, 44 and 50, 52 are advanced or moved inwardly toward the stations in the bearings 46, 48 and 54, 56. In practice, the jaw blades 38 and 40 are moved toward each other to clampingly engage opposite sides of the workpieces 14 at the beginning of the transfer operation and the jaw blades are separated or moved apart to disengage the workpieces after the latter have been advanced one station in the machine by means hereinafter described in detail. The jaw blades 38 and 40 are moved into and out of clamping engagement with the workpieces 14 by actuator means 57 and 59 disposed at the outer ends of the rods 42, 44 and 50, 56, respectively.

More particularly, the actuator means 57 associated with the jaw blade 38 comprises a horizontal rock shaft 60 disposed parallel to and spaced laterally substantially to one side of the stations 15–22. The shaft 60 is mounted for oscillatory movement in spaced bearings 62 and 64 mounted on and fixed to the die shoe 12. Upstanding rocker arms 66 and 68 on and fixed to opposite ends of the rock shaft 60 carry a cross bar 70. Spaced rollers 72 and 74 on the rearward or outer end of the rod 42 embrace and closely receive the cross bar 70. Similarly, spaced rollers 76 and 78 on the outer terminal portion of the rod 44 embrace and closely receive the bar 70. When the rock shaft 60 turns in the bearings 62 and 64 in clockwise direction as viewed in FIG. 2, it swings the rocker arms 66 and 68 toward the work stations 15–22 and acts through the inner rollers 74 and 78 to slide the rods 42 and 44 inwardly in the bearings 46 and 48 to bring the jaw blade 38 into clamping engagement with the workpieces 14. Conversely, when the rock shaft 60 turns counterclockwise, it acts through the outer rollers 72 and 76 to withdraw the jaw blade 38 to release the workpieces 14.

Similar means is provided for moving the jaw blade 40 associated with the other actuator means 59 into and out of clamping engagement with the workpieces 14. A rock shaft 80 is also disposed parallel to and laterally of but at the opposite side of the stations 15–22 is mounted in spaced bearings 82 and 84 supported on and fixed to the die shoe 12. Upstanding rocker arms 86 and 88 on and fixed to the rock shaft 80 at opposite ends thereof are connected at their upper ends by a cross bar 90. Spaced rollers 92 and 94 on the rod 50 embrace and snugly fit the cross bar 90 and correspondingly spaced rollers 96 and 98 on the rod 52 similarly embrace and closely receive the cross bar 90 so that oscillatory movement of the rock shaft 80 acts through the rollers 92, 94 and 96, 98 to slide the rods 50 and 52 back and forth in the bearings 54 and 56 thereby to move the jaw blade 40 into and out of clamping engagement with the workpieces 14.

In practice, the rock shafts 60 and 80 are turned simultaneously by the two actuator means 57 and 59 at the beginning of the transfer operation to advance the jaw blades 38 and 40 from opposite sides of the work stations 15–22 into clamping engagement with the workpieces 14. After the workpieces 14 have been advanced one station in the machine by means hereinafter described in detail, the rock shafts 60 and 80 are again operated simultaneously in opposite directions to move the jaw blades 38 and 40 away from the work stations 15–22 and out of engagement with the workpieces 14.

Figure 1:
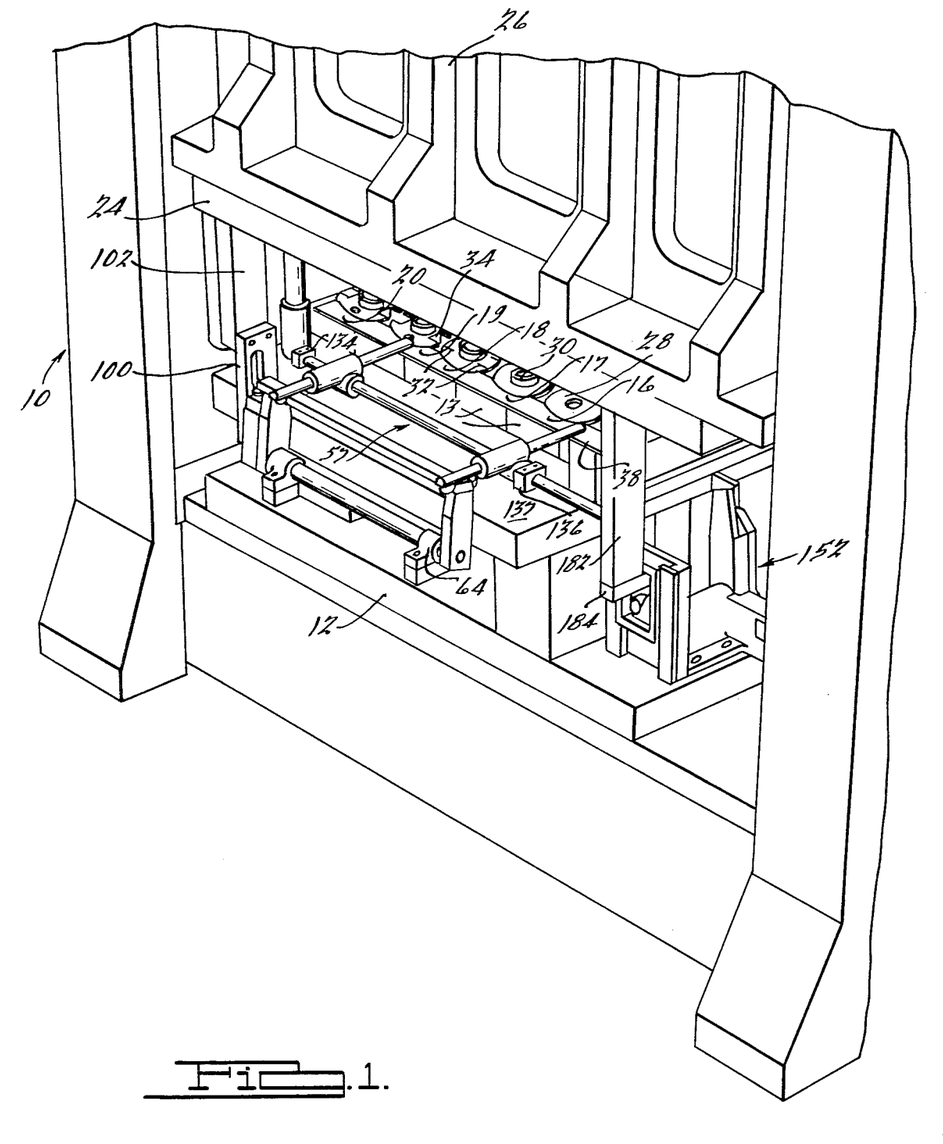
FIG. 1 is a fragmentary, perspective view of a conventional press showing the transfer device of this invention mounted therein.

The means for oscillating the rock shaft 60 comprises a cam bar 100 attached to and movable vertically with an actuator bar 102 carried by and depending from the punch shoe 24 at one corner thereof, as perhaps best shown in FIG. 1. The cam bar 100 extends downwardly alongside but spaced laterally from the rocker arm 66, and a cam slot 104 therein receives a cam follower roller 106 mounted for rotation on and disposed laterally of a clutch arm 108 which is mounted loosely in the rock shaft 60 at the outer side of the rocker arm 66. The terminal portions 110 and 112 of the cam slot 104 are disposed vertically in the cam bar 100 but are offset laterally from each other and interconnected by an inclined slot portion 114. As perhaps best shown in FIG. 2, the upper terminal portion 110 is disposed adjacent to the outer edge of the cam bar 100, the intermediate portion 114 inclines downwardly and inwardly toward the work stations 15-22, and the lower terminal portion 112 is disposed adjacent the inner edge of the cam bar.

A clutch mechanism 115 releasably interconnects the rocker arm 66 and the clutch arm 108 for mutual operation with the rock shaft 60. More particularly, a spring loaded clutch element 116 yieldingly engages a pin 118 carried by and projecting laterally from the rocker arm 66. When the ram 26 is at the lower limit of its power stroke, viz., in the fully "down" position, the cam follower 106 is at or adjacent to the upper end of the cam slot 104 and, by reason of the fact that the upper terminal portion 110 of the slot is at the outer side of the cam bar 100, the rock shaft 60 is at the limit of its counterclockwise oscillatory movement as viewed in FIG. 2 and the jaw blade 38 associated therewith is pulled back away from and out of engagement with the workpieces 14. As the ram 26 retracts or moves upwardly in the press 10, it pulls the cam bar 100 upwardly with it and the cam follower 106 moves downwardly in the cam slot 104.

During the initial retractive movement of the ram 26 when the upper dies carried by the punch shoe 24 are moving away from and clearing the workpieces 14 in the stations 15-22, the cam roller 106 simply traverses the straight upper terminal portion 110 of the cam slot 104 without effect insofar as the transfer device is concerned. However, after the initial retractive movement of the ram 26, the cam roller 106 enters the inclined intermediate portion 114 of the cam slot 104 and, as the cam roller traverses the slot portion 114, it moves to the right or toward the stations 15-22 and acts through the clutch arm 108 and the rocker arm 66 to turn the rock shaft 60 clockwise as viewed in the drawing. This in turn swings the cross bar 70 in the direction of the stations 15-22 and advances the rods 42 and 44 in the manner hereinabove described to move the jaw blade 38 into clamping engagement with adjacent edges of the workpieces 14.

The clutch element 116 is spring pressed against the pin 118 with sufficient force so that the clutch arm 108 and the rocker arm 66 move always together and in unison to slidably actuate the associated jaw assembly except in case of the jam such as might occur if one of the workpieces becomes displaced from its work station. In this latter event, the clutch element 116 releases the pin 118 and permits the ram 26 to complete its retractive movement without effect on the transfer device to thereby prevent damage to the transfer device in the normal operation of the equipment.

Conversely, the cam roller 106 is at or near the bottom of the lower slot portion 112. When the ram 26 is at the upper limit of its travel in the press 10, and when the ram moves downwardly on its power stroke, the cam roller 106 traverses the cam slot 104 to perform the operations described above in reverse order with the result that the rock shaft 60 is turned counterclockwise to withdraw the jaw blade 38 from the work stations 15-22 and to disengage the blade from the workpieces 14.

The portion of the transfer device associated with the jaw blade 40 at the opposite side of the work stations 15-22 is similarly actuated to move the jaw blade either into or out of clamping engagement with the workpieces 14. Inasmuch as the two actuator means 57 and 59 are similar in construction and operation, a detailed description of the mechanism for actuating the jaw bar 40 is not necessary for a complete understanding of the construction and operation of the transfer device as a whole. Suffice it to say that a cam bar 120 similar to the cam bar 100 is attached to and actuated by the ram 26 adjacent to the left rear corner thereof as viewed in FIG. 1. The cam bar 120 has a cam slot (not shown) similar to the cam slot 104, and a cam roller (not shown) on a clutch arm 122 loosely mounted on the rock shaft 80 moves in the cam slot to oscillate the rock shaft and the rocker arms 86 and 88 to swing the cross bar 90 and to slidably actuate the rods 50 and 52 associated therewith to move the jaw blade 40 toward or from the line of stations 15-22. The clutch arm 122 similarly is detachably connected to the rocker arm 86 for mutual operation therewith by a clutch mechanism 123. More particularly, the clutch arm 122 carries a spring loaded clutch element 124 that normally seats against and retains a pin 126 on the rocker arm 86 so that lateral movement of the clutch arm by the cam and cam follower means causes the rocker assembly 59 to move in unison therewith and to reciprocably actuate the jaw assembly in the manner described.

The workpieces 14 are indexed progressively from station to station in the press 10 by moving the jaw assemblies (viz., the jaws 38 and 40, the rods 42, 44 and 50, 52 and the bearings 46, 48 and 54, 56) parallel to the line of stations 15-22 a distance equal to the spacing between adjacent stations while the jaws are advanced and in clamping engagement with the workpieces. To this end, the two bearings 46 and 48 are mounted on and fixed to transverse bearings 128 and 130 that in turn are fixed to a shaft 132 which is mounted for reciprocation in bearing blocks 134 and 136 on and fixed to a stationary plate 137 (FIG. 1) which is part of the die shoe 12. Similarly, the bearings 54 and 56 are fixed to transverse bearings 138 and 140 that are carried by and fixed to a shaft 142 which is mounted for reciprocation in bearing blocks 144 and 146 mounted on and fastened to the plate 137. The shafts 132 and 142 are interconnected at one end thereof by a cross bar 148 and a laterally outwardly extending lug 150 at substantially the middle of the cross bar is pivotally and slidably connected to an actuator means designated generally by the numeral 152.

The actuator means 152 comprises a rock shaft 154 (FIG. 4) which is rotatably supported by spacing bearings 156 and 158 mounted in a housing 160 which is supported on and fixed to the die shoe 12 at one end of the work stations 15-22. Formed integrally with the housing 160 at one end thereof is an upstanding support 162 which has a vertical way 164 formed therein at the outer side thereof in which a slide 166 is confined for vertical translatory movement. A vertical cam slot 168 (FIG. 2) in the slide 166 receives a cam follower roller 170 on and disposed laterally of a rocker arm 172 (FIG. 4) at one end of and connected to the rock shaft 154 by a key 174. As perhaps best shown in FIG. 2, the cam slot 168 has vertical upper and lower terminal portions 176 and 178 which are offset with respect to each other and interconnected by an inclined middle or intermediate portion 180.

It will be observed that the actuator means 152 is disposed to the right of the stations 15-22, as viewed in FIGS. 1 and 2, and that the upper terminal portion 176 of the cam slot 168 is offset to the right of the lower terminal portion 178. Thus, upward movement of the slide 166 in the way 164 acts through the cam follower 170 as it traverses the inclined intermediate portion 180 of the cam slot 168 to turn the rocker arm 172 and the rock shaft 154 in a counterclockwise direction as viewed in FIG. 2. Conversely, downward movement of the slide 166 acts through the cam follower 170 as it transverses the intermediate portion 180 of the cam slot 168 to turn the rocker arm 172 and the rock shaft 154 clockwise. Movement of the cam follower 170 in the upper and lower terminal portions 176 and 178 of the cam slot 168 of course is without effect and does not actuate either the rocker arm 172 or the rock shaft 154.

The slide 166 is actuated by the ram 26 through an actuator bar 182 (FIG. 1) and a striker block 184 on and extending laterally inwardly from the actuator bar. The striker block 184 extends laterally into a vertically elongate recess 186 formed in the outer face of the slide 166 longitudinally and transversely coextensively with the cam slot 168. The striker block 184 is disposed at the lower end of the recess 186 when the ram 26 is at the lower limit of its travel in the press 10. During initial upward movement of the ram 26, the striker block 184 moves to the top of the recess 186 without effect insofar as operation of the actuator means 152 is concerned. Thereafter, continued upward movement of the ram 26 acts through the striker block 184 to lift the slide 166 in the way 164 and, as the slide moves upwardly in the way, the cam follower 170 moves downwardly in the cam slot 168 to turn the rocker arm 172 and rock shaft 154 counterclockwise in the manner hereinabove described. Conversely, when the ram 26 moves downwardly on its power stroke the initial movement is without effect on the actuator means 152 since the striker block 184 simply traverses the recess 186 in the slide 166. However, when the striker block 184 reaches the lower end of the recess 186 it moves the slide 166 downwardly in the way 164 and causes the cam follower 170 to move upwardly in the cam slot 168 so as to turn the rocker arm 172 and the rock shaft 154 clockwise.

Oscillatory movement of the rock shaft 154 is transmitted to the cross bar 148 through a clutch arm 188 (FIGS. 2, 3 and 4) on and rotatably fixed by a key 190 to the end of the rock shaft 154 opposite the rocker arm 172, and a clutch mechanism designated generally by the numeral 192 at the upper end of the clutch arm 188 connects the latter to a rocker arm 194 loosely mounted on the rock shaft 154 between the clutch arm and the adjacent end of the housing 160. A roller 196 on the cross bar lug 150 travels in a vertical way 198 provided in the rocker arm 94 so that counterclockwise oscillation of the rock shaft 154 acts through the clutch arm 188, clutch mechanism 192, rocker arm 194, roller 196, cross bar 148 and the two shafts 132 and 142 to move the jaw assemblies bodily to the left, as viewed in FIGS. 1 and 2. In practice, this motion is performed when the jaw blades 38 and 40 are in clamping engagement with the workpieces 14, and the inclined middle portion 180 of the cam slot 168 which generates the motion is dimensioned so that the jaw assemblies and the workpieces are moved a distance equal to the spacing between adjacent stations 15-22. Thus, full oscillatory movement of the rock shaft 154 causes all of the workpieces 14 to advance one station in the press 10. Conversely, clockwise movement of the rock shaft 154 acts through the same linkage mechanism referred to specifically above to move the jaw assemblies the same distance to the right, as viewed in the drawings. In practice, this latter movement is performed when the jaw assemblies are retracted and disengaged from the workpieces 14.

Figure 4:
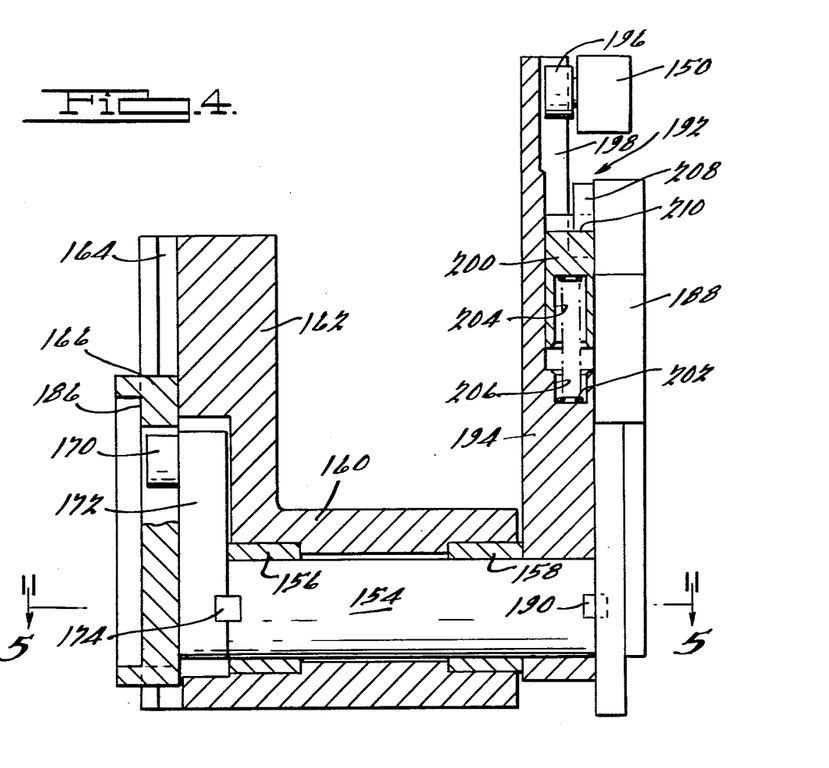
FIG. 4 is a vertical sectional view taken on the line 4—4 of FIG. 3.
Figure 5:
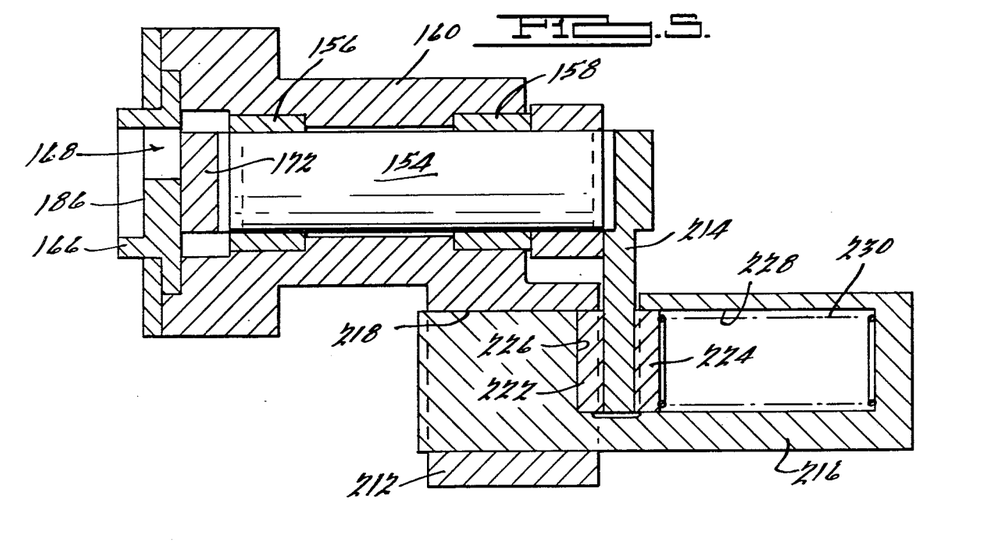
FIG. 5 is a horizontal sectional view taken on the line 5—5 of FIG. 4.

For a detailed description of the clutch mechanism 192 attention is now directed to FIGS. 3 and 4. A clutch element 200 is slidably mounted in the way 198 below the roller 196, and a compression spring 202 confined between the bottom of the way and the clutch element holds the latter normally in a raised or extended position. If desired, the upper and lower terminal portions of the spring 202 can be retained in sockets 204 and 206 provided in the lower end of the clutch element 200 and the bottom of the way 198 to assist in retaining the clutch element in the way 198. A roller 208 carried by the clutch arm 188 normally seats in an arcuate recess 210 in the top of the clutch element 200 and is held firmly in pressed engagement therewith by the compression spring 202. In practice, the spring 202 presses the clutch element 200 against the roller 208 with sufficient force to releasably join the clutch arm 188 and the rocker arm 194 for mutual operation by the rock shaft 154. However, in the event some obstruction is encountered in the indexing movement of the transfer device, the roller 208 rolls out of its seat 210 against the resilient action of the spring 202 and disengages the clutch arm 188 from the rocker arm 194 so that the portion of the mechanism actuated by the ram 26 is free to complete its motion without driving the transfer device whereby to prevent damage to the latter.

While the clutch mechanism 192 only is here shown in detail, it will be readily appreciated that the clutch mechanism 115 that interconnects the rocker arm 66 and the clutch arm 108 as well as the clutch mechanism 123 that interconnects the rocker arm 86 to the clutch arm 122 are both similar in construction and operation to the clutch mechanism 192.

As previously suggested, a significant part of the inventive concept of this invention is the discovery that the press 10 can be operated at significantly higher speeds than heretofore without objectionable and destructive vibration during the transfer operation in the various linkages that actuate the jaw blades 38 and 40 if a brake mechanism is included in one or more of the linkages. It is most important that a brake mechanism be incorporated in the indexing actuator means 152 since this particular actuator is required to move the jaw assemblies and the parts associated therewith the greatest distance; furthermore, the greatest amount of mass and weight is involved in the indexing movement of the jaw assemblies and the workpieces 14. On the other hand, the linkage mechanisms 57 and 59 that move the jaw assemblies into and out of clamping engagement with the workpieces 14 are required to move only a comparatively short distance and the mass or weight of the moving parts is considerably less. Thus, a brake mechanism is here shown incorporated in the indexing actuator means 152 only; however, it is to be understood that if necessary or desirable a similar brake mechanism can be incorporated in the actuator means 57 and 59.

More particularly, the brake mechanism comprises a support 212 on and extending laterally outwardly from the housing 160 and a laterally outwardly extending plate-like brake element 214 on the clutch arm 188 beside and spaced slightly from the support member. An elongate brake housing 216 of generally square cross-section is slidably mounted in a correspondingly shaped opening 218 in the support 212. The brake element 214 overlaps a portion of the opening 218, and the brake housing 216 is formed with a recess 220 that accepts the overlapping portion of the brake element. Further, the recess 220 is at least slightly wider than the brake element 214 so that the latter is free to oscillate with the clutch arm 188 without direct interference from the housing 216. However, oscillatory movement of the element 214 is braked by shoes 222 and 224 that are disposed in confronting sockets 226 and 228 provided in opposite sides of the recess 220 and that bear against opposite sides of the brake element 214 under action of a compression spring 230 diposed in the socket 228 and confined between the bottom of the socket and the brake shoe 224.

In operation, the brake housing 216 is free to slide back and forth in the opening 218 to accommodate any irregularities in the brake element 214, and the spring 230 holds the brake shoes 222 and 224 at all times firmly in pressed engagement with the brake element 214 as the latter oscillates with the clutch arm 188. Pressure exerted against the brake element 214 by the brake shoes 222 and 224 take up play or lost motion between the interconnected relatively movable parts of the actuator means 152, and particularly interaction between the brake shoes and the brake element keeps the cam follower 170 in pressed engagement with one side or the other of the cam slot 168 during both upward and downward movement of the slide 166. Experience demonstates that the brake mechanism permits the press 10 to cycle significantly faster without objectionable and destructive vibration of the transfer device. Experience further indicates that, in relatively large and heavy transfer devices, it is desirable to incorporate the brake mechanism in all of the actuator means 57, 59 and 152, but in relatively light transfer devices a single brake mechanism associated with the linkage mechanism 152 only is adequate.

The following is a brief description of the operation of the press 10 and of the transfer device of this invention associated therewith. In FIG. 1 the transfer device is shown in a fully closed press position and the cycle is complete. The operation of the transfer device begins when the ram 26 is withdrawn in an upward direction. This action also moves the cam bars 100 and 120 and the striker block 184 attached to the punch shoe 24 in an upward direction. However, this initial movement causes no movement of the transfer device due to the dwell areas provided by the upper cam slot portions 110 of the cam slot 104 and the recess 186 in the slide 166. The first movement of the transfer action begins when the camming surfaces of the intermediate cam slot portions 114 in the two actuator means 57 and 59 contact the cam followers attached to clutch arms 108 and 122 to force the cross bars 70 and 90 inwardly toward the stations 15–22 and the jaw blades 38 and 40 into clamping engagement with the workpieces 14. The forward indexing action occurs after the striker block 184 has traveled through the dwell area provided by the recess 186 in the slide 166. The striker block 184 does not reach the end of the recess and begin to lift the slide 166 until after the jaw blades 38 and 40 have clamped the workpieces 14. However, as soon as the slide 166 begins to rise, the cam slot 168 forces the cam follower 170 to the left as viewed in FIG. 2 to swing the clutch arm 188 and the rocker arm 194 in the same direction. As the rocker arm 194 turns counterclockwise in the manner described, it drives the roller 196 and the cross bar 148 also to the left to index the jaw assemblies and to move the workpieces 14 clamped thereby each one station in the press 10.

The brake mechanism shown in FIG. 3 is a means of keeping the roller 170 against the cam track 168 and of preventing movement between other interconnected and relatively movable parts of the actuator linkage which causes shaking and vibration of the mechanism in use. The float of the brake housing 216 insures constant pressure of brake pads 222 and 224 against the brake element 214 at all times. The forward transfer of the workpieces is completed on the final up stroke of the ram 26.

As the ram 26 begins to move downwardly in the press 10 after the stamping operation on the workpieces is completed, the action of the transfer device is reversed. Cam bars 100 and 120 force jaw assemblies apart and disengage the jaw blades 38 and 40 from the workpieces 14. The slide 166 is forced downwardly moving the cam follower 196 to the right as shown in FIG. 2, and returning the cross bar 148 and the jaw assemblies to their original or starting positions.

Figure 6:
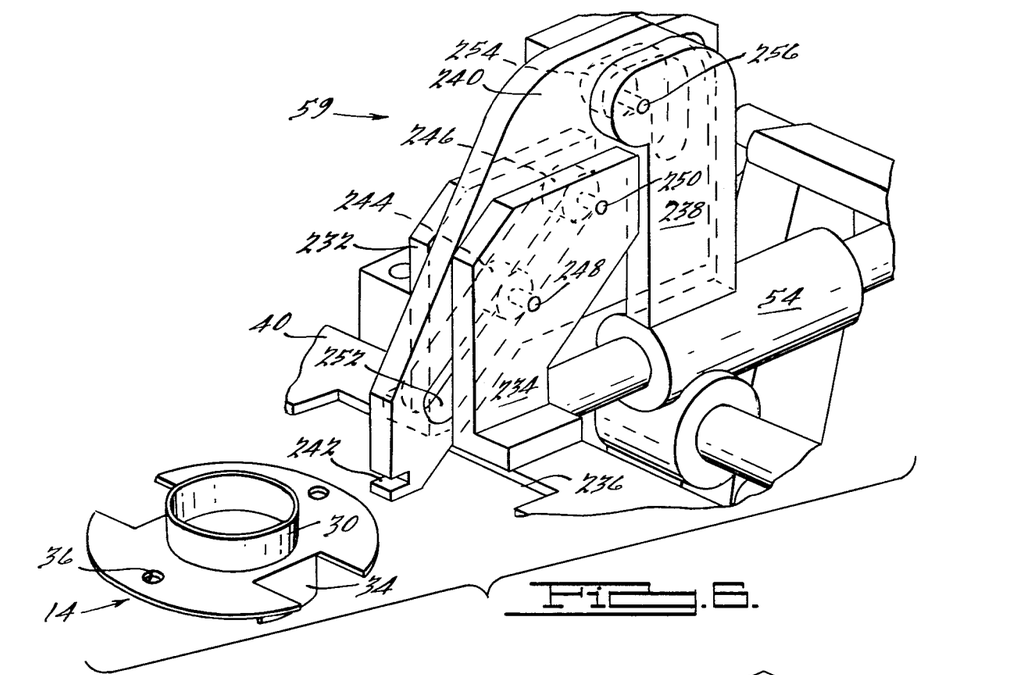
FIG. 6 is a fragmentary, perspective view illustrating the modified lift and carry form of transfer device and showing the latter in its initial or starting position with the jaw blades disengaged from the workpieces.
Figure 7:
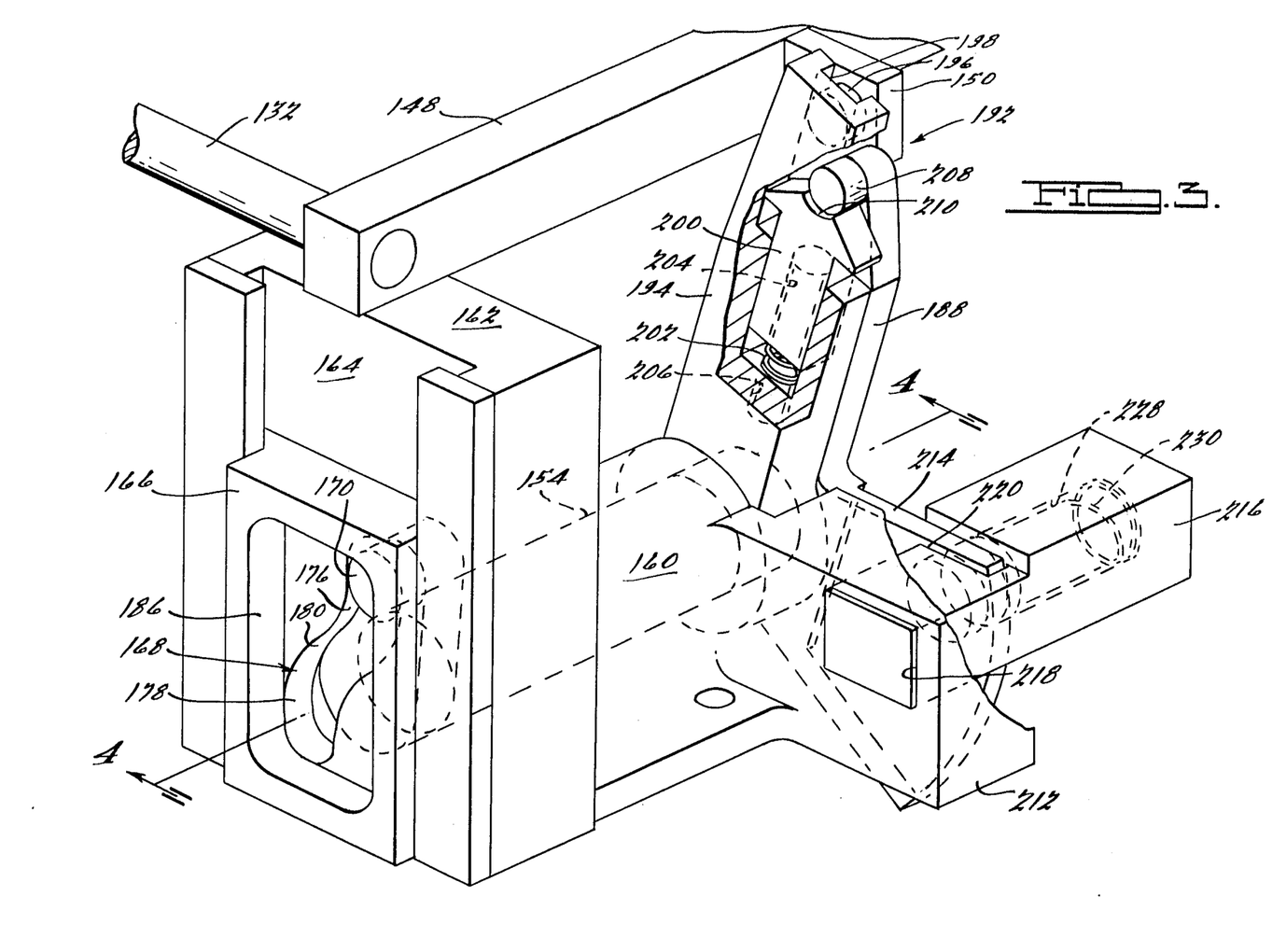
FIG. 7 is a view similar to FIG. 6 but showing the jaw blades engaged with the workpieces and the latter raised or lifted in the work stations.

As previously indicated, the lift and carry mechanism illustrated in FIGS. 6 and 7 can be readily incorporated in the transfer device as a special feature. A lift and carry mechanism is here shown at one station only but it will be readily appreciated that similar lift and carry devices can be provided at all of the stations or at any selected number or arrangement of stations depending on the exigencies of the particular situation. In general, provision for lifting and carrying of the workpieces 14 from one station to the next is necessary if the shape of the workpiece makes it difficult or impossible simply to slidably index it as in the form of the device hereinabove described.

According to the present invention, the part lift and carry option comprises a pair of laterally spaced, upright mounting brackets 232 and 234 supported on and welded or otherwise attached to the jaw blade (here shown as the jaw blade 40 for purposes of illustration) at a station position. In this connection, it will be readily appreciated that, wherever it is necessary to lift the part 14 out of a station, lift mechanisms are provided opposite each other on both of the jaw blades 38 and 40. Where a lift device is used, it is not necessary that the jaw blade have a work engaging, scalloped indentation 58 at the station where the lift device is mounted. In these situations, the mounting brackets 232 and 234 are positioned at the rear of the jaw blade and the portion of the latter that otherwise would extend forwardly of the brackets is cut away, as at 236, to provide clearance for the workpiece 14. Thus, the portions of the blades 38 and 40 that support the lift devices do not serve as jaws for engaging and holding the workpieces 14 but merely as supports for the lift devices.

The lift device is shown at a work station in-line with the bearing 54 and a third mounting bracket 238 is welded or otherwise fixedly attached to the bearing 54 directly behind the bracket 234. In this connection, however, it will be readily appreciated that, if the lift device were at some other station, some other suitable support for the bracket 238 would be provided on the shaft 142.

A jaw blade 240 is mounted for free sliding movement between the two front brackets 232 and 234 and along side the rear bracket 238, and a portion of the jaw blade extending forwardly of the front brackets 232 and 234 is provided in the forward edge thereof with a recess 242 that accepts a marginal edge portion of the workpiece 14. Spaced cam rollers 244 and 246 disposed between the front mounting brackets 232 and 234 are freely rotatable on pins 248 and 250. The pins 248 and 250 extend laterally of the rollers and the projecting portions thereof are press fitted in suitable openings provided in the mounting brackets 232 and 234. It will be observed that the roller 246 is disposed above and rearwardly with respect to the roller 244 and that both rollers operate in a single cam slot 252 provided in the jaw blade 240. The cam slot 252 is straight but inclined upwardly and rearwardly in the same manner and at the same angle as the rollers 244 and 246. A third cam roller 254 is mounted for free rotation and retained on a pin 256 which extends laterally of the roller and has the extending portion thereof embedded in and retained by the rear mounting bracket 238. The roller 254 operates in an L-shaped cam slot 258 provided in the rear portion of the jaw blade 240 alongside the rear mounting bracket 238. As perhaps best shown in FIG. 7, the cam slot 258 has an upper horizontal portion 260 and a vertical portion 262 that extends downwardly from the rearward end of the upper horizontal portion 260.

In use, the cam rollers 244 and 246 move back and forth in the cam slot 252 and the cam roller 254 moves simultaneously in the L-shaped cam slot 258 and from one portion 260 to the other portion 262 thereof as the jaw blades 38 and 40 move to and from the stations 15-22. In this connection, it should be noted that the jaw blades 38 and 40 are moved exactly as in the form of the invention first described. The only difference is that, instead of the workpieces being engaged and clamped in the work receiving scalloped recesses 58, they are received in but not necessarily clamped by the recesses 242 in the jaw blades 240.

At the beginning of the operating cycle utilizing the lift and carry mechanism, the supporting bars 38 and 40 are withdrawn or laterally away from the line of workpieces 14, the cam rollers 244 and 246 associated with each mechanism are disposed at the upper or outer end of the cam slot 252, and the cam roller 254 is positioned at the forward or inner end of its horizontal cam slot 260, as shown in FIG. 6. As the bars 38 and 40 advance or move inwardly toward the line of workpieces 14, the mounting brackets 232 and 234 of each mechanism move with the bars 38 and 40 on which they are mounted and act through the cam rollers 244 and 246 to move the jaw blade 240 bodily horizontally toward the workpiece 14 to interengage the jaw recess 242 with the workpiece in the station served by the mechanism. As the jaw blade 240 advances, the cam roller 254 moves to the rearward or outer end of the horizontal cam slot 260. In practice, the roller 254 seats on the jaw blade 240 at the rearward end of the cam slot 260 at the same time the recess 242 accepts and interengages with the workpiece 14. When this occurs, the cam roller 254 prevents further advancement of the jaw blade 240. However, the supporting bar 40 continues to advance toward the workpiece and this causes the rear cam roller 254 to move downwardly in the vertical cam slot 262 while the two front cam rollers 244 and 246 move in the inclined cam slot 252. As a result, the jaw blade 240 moves vertically upwardly as shown in FIG. 7 and, in conjunction with the opposite lift mechanism, lifts, the workpiece 14 engaged thereby out of the work station preparatory to horizontal indexing movement thereof into an adjacent station by the end actuator means 152.

After the workpieces 14 have been indexed or moved to adjacent stations in the press 10, retraction or outward horizontal movement of the bars 38 and 40 in the manner previously described, causes the two opposed lift mechanisms to lower the workpiece 14 carried thereby into the station in which it has been transferred. As each of the supporting bars move horizontally away from the stations, the associated jaw blade 240 cannot move with it during the initial movement because the jaw blade is held by the cam roller 254. However, the initial retractive movement of the bar 40 causes the jaw blade 240 to move vertically downwardly as the vertical cam slot 262 moves downwardly on the rear cam roller 254 and the two front cam rollers 244 and 246 move to the right in the inclined cam slot 252. By the time the front cam rollers 244 and 246 reach the upper outer end of the inclined cam slot 252 and the rear cam roller 254 reaches the upper limit of the vertical cam slot 262, the roller 254 releases the jaw blade 240 for retractive movement with the bar 40 since it is then positioned to move forwardly in the horizontal cam slot 260. Thereafter, the jaw blade 240 retracts with the bar 40. As the blade 240 begins to retract, it pulls away from and disengages the workpiece 14. During the final retractive movement of the bar 40, the jaw blade 240 pulls back bodily away from its work station and the working parts of the lift mechanism return to their initial starting positions.

I claim:

1. A work transfer device for moving workpieces progressively from station to station in a press of the type having a reciprocal part and a series of in-line stations in which operations are performed on said workpieces, said transfer device comprising opposed work holding jaw means; and first and second actuator means operatively connected to and actuated by said reciprocable part, said first actuator means adapted to reciprocally actuate said jaw means transversely of said work stations into and out of engagement with workpieces therein, said second actuator means including a rock shaft drivingly connected to said jaw means and operable to reciprocally actuate the same while engaged with said workpieces to move the latter to the next adjacent stations in said press, cam and cam follower means drivingly connected to said rock shaft, and brake means coactive with said rock shaft yieldably resisting movement thereof and operative to hold said cam and cam follower means in pressed engagement with each other during operation of said press, whereby to inhibit destructive vibration of said transfer device in use under at least certain operating conditions of said press.

2. A work transfer device for moving a plurality of workpieces progressively from station to station in a press of the type having a reciprocable part and a series of in-line stations in which operations are performed on said workpieces, said transfer device comprising work holding jaw means disposed in opposed relation on opposite sides of said stations; and first and second actuator means operatively connected to and actuated by said reciprocable part, said first actuator means adapted to reciprocally actuate said jaw means transversely of said work stations into and out of engagement with workpieces therein, said second actuator means adapted to reciprocally actuate said jaw means while the latter are clampingly engaged with said workpieces to index the same simultaneously to the next adjacent station, at least one of said actuator means having a rock shaft drivingly connected to move said jaw means, cam and cam follower means drivingly connected to said rock shaft, and brake means coactive with said rock shaft yieldably resisting movement thereof and operative to hold said cam and cam follower means in pressed mutual engagement during operation of said press, whereby to inhibit destructive vibration of said transfer device in use.

3. The work transfer device as set forth in claim 2 wherein said brake means comprises a radially extending actuating arm on and movable with said rock shaft, a brake member coactive with said arm extending radially from and oscillatable with said rock shaft, and brake shoe means yieldably, frictionally engaging said brake member.

4. The work transfer device as set forth in claim 2 wherein said brake means comprises a radially extending actuating arm on and movable with said rock shaft, a brake member coactive with said arm extending radially from and oscillatable with said rock shaft, a stationary housing supporting said rock shaft for oscillatory movement having a surface thereof disposed adjacent to said brake member, a brake housing extending through the mentioned surface of said stationary housing and supported by the latter for free sliding movement, said brake housing having a recess therein accepting said brake member, movable brake pads in and retained by said brake housing on opposite sides of and in engagement with said brake member, and spring means holding said pads yieldably pressed against said brake member.

5. The work transfer device as set forth in claim 2 wherein said brake means comprises a brake member coactive with said rock shaft, stationary support means adjacent to said brake member, a brake housing mounted for free sliding movement in said support means and having a recess accepting said brake member, a pair of movable brake pads in and retained by said brake housing on opposite sides of and in engagement with said brake member, and compression spring means in said brake housing bearing on one of said brake pads and acting through said brake housing to hold both of said brake pads pressed with substantially equal force against said brake member.

6. The work transfer device as set forth in claim 2 including vertical actuator means mounted on said jaw means and said first actuator means in at least certain of said stations operative to lift said workpieces in said certain stations in response to transverse movement of said jaw means toward and into engagement with said workpieces and prior to the indexing operation of said first actuator means, said vertical actuator means being further operative to lower the workpieces associated therewith into said stations in response to transverse movement of said jaw means away from and out of engagement with said workpieces and after the indexing operation of said second actuator means.

7. The work transfer device as set forth in claim 6 wherein each of said vertical actuator means comprises front and rear mounting brackets on and movable with said jaw means and said first actuator means, respectively, a work engaging blade member, and second cam and cam follower means interconnecting said mounting brackets and said blade member operative in response to transverse movement of said jaw means to raise and lower said blade member and the workpieces engaged thereby.

8. The work transfer device as set forth in claim 7 wherein said second cam and cam follower means comprises an inclined cam slot in said blade member, cam rollers carried by said front mounting bracket operable in said inclined cam slot, a second cam slot in said blade having horizontal and vertical portions, and a cam roller carried by said rear mounting bracket operable in said second cam slot.

* * * * *

UNITED STATES PATENT AND TRADEMARK OFFICE
CERTIFICATE OF CORRECTION

PATENT NO. : 4,198,845
DATED : April 22, 1980
INVENTOR(S) : Hugh M. Sofy

It is certified that error appears in the above—identified patent and that said Letters Patent are hereby corrected as shown below:

Column 1, line 25, "transverse" should be -- traverse --.

Column 3, line 25, "unfinished" should be -- finished --.

Column 6, line 53, "spacing" should be -- space --.

Column 7, line 12, "transverses" should be -- traverses --.

Column 12, line 34 (Claim 1), "reciprocal" should be -- reciprocable --.

Signed and Sealed this

Twenty-eighth Day of October 1980

[SEAL]

Attest:

Attesting Officer

SIDNEY A. DIAMOND

Commissioner of Patents and Trademarks